(12) United States Patent
Gueta et al.

(10) Patent No.: US 12,204,492 B2
(45) Date of Patent: Jan. 21, 2025

(54) RETENTION POLICY DETERMINATION SYSTEM AND METHOD

(71) Applicant: GLASSBOX LTD., Petah Tikva (IL)

(72) Inventors: Yaron Gueta, Hod Hasharon (IL); Yoav Schreiber, Petach Tikva (IL)

(73) Assignee: GLASSBOX LTD., Petah Tikva (IL)

( * ) Notice: Subject to any disclaimer, the term of this patent is extended or adjusted under 35 U.S.C. 154(b) by 0 days.

(21) Appl. No.: 18/178,828

(22) Filed: Mar. 6, 2023

(65) Prior Publication Data
US 2023/0281160 A1    Sep. 7, 2023

Related U.S. Application Data

(60) Provisional application No. 63/317,092, filed on Mar. 7, 2022.

(51) Int. Cl.
*G06F 16/00* (2019.01)
*G06F 16/11* (2019.01)

(52) U.S. Cl.
CPC .................................. *G06F 16/125* (2019.01)

(58) Field of Classification Search
CPC . G06F 16/125; G06F 11/3438; G06F 11/3476
See application file for complete search history.

(56) References Cited

U.S. PATENT DOCUMENTS

| | | | |
|---|---|---|---|
| 9,167,047 B1 | 10/2015 | Sharma et al. | |
| 10,353,619 B1 | 7/2019 | Jha | |
| 2006/0004847 A1 | 1/2006 | Claudatos et al. | |
| 2008/0244694 A1 | 10/2008 | Neystadt et al. | |
| 2010/0131470 A1* | 5/2010 | Schmidt | H04L 51/04 |
| | | | 707/665 |
| 2011/0287748 A1 | 11/2011 | Angel et al. | |
| 2013/0064521 A1 | 3/2013 | Gonsalves et al. | |

(Continued)

FOREIGN PATENT DOCUMENTS

EP    3101557 A1    12/2016

OTHER PUBLICATIONS

European Search Report ; May 22, 2023.

*Primary Examiner* — Syed H Hasan
(74) *Attorney, Agent, or Firm* — S. J. INTELLECTUAL PROPERTY; Avi Jencmen

(57) ABSTRACT

A system comprising a processing circuitry configured to: obtain a plurality of recordings of respective sessions conducted on respective computerized applications; determine, for each recording of the recordings, one or more attributes, wherein at least one attribute of the attributes is determined by analyzing content of the respective recording; and determine, for each given recording of the recordings, based on the at least one attribute determined for the given recording, a respective retention policy, defining at least a retention period for retaining the given recording prior to deleting the given recording; wherein a first retention policy determined for a first recording of the recordings having a first set of one or more first attributes of the attributes is different than a second retention policy determined for a second recording of the recordings having a second set of one or more second attributes of the attributes, other than the first attributes.

16 Claims, 1 Drawing Sheet

(56) References Cited

U.S. PATENT DOCUMENTS

| | | | |
|---|---|---|---|
| 2014/0059023 A1* | 2/2014 | Freeman | G06Q 10/10 |
| | | | 707/694 |
| 2014/0137052 A1* | 5/2014 | Hernandez | G06F 11/3438 |
| | | | 715/863 |
| 2016/0057482 A1 | 2/2016 | Anderson et al. | |
| 2016/0180352 A1* | 6/2016 | Chen | G06Q 30/016 |
| | | | 705/7.29 |
| 2017/0048556 A1* | 2/2017 | Drako | H04N 19/91 |
| 2017/0149966 A1 | 5/2017 | Anderson | |
| 2017/0285755 A1* | 10/2017 | Churchill | G06N 5/04 |
| 2018/0088771 A1* | 3/2018 | Oren | G06F 3/04812 |
| 2018/0359272 A1 | 12/2018 | Mizrachi et al. | |
| 2019/0188196 A1 | 6/2019 | Kumar | |
| 2021/0133329 A1* | 5/2021 | Andrews | G06F 21/577 |
| 2023/0237120 A1* | 7/2023 | Colombet | G06F 16/9577 |
| | | | 715/234 |

\* cited by examiner

RETENTION POLICY DETERMINATION SYSTEM AND METHOD

TECHNICAL FIELD

The invention relates to a retention policy determination system and method.

BACKGROUND

Record keeping of digital sessions is a term used to define the retention of data obtained during a session of a user's activity on a particular computerized application (such as a web application, or a mobile application), which can later be used to analyze at least part of the user's experience during the session (e.g., to see and experience what the user experienced during at least part of the session).

Nowadays, current record keeping solutions of data for later use in order to replay a session, involve the retention (and enable also extending the retention) of all sessions of user activity (e.g. within a specific web application or mobile application), for a set period of time (e.g., a month, a year, seven years, etc.), without having the ability to determine the retention of only specific sessions that have certain attributes that are defined based on something that happened during the session (like a specific dynamic event—pressing a specific button, mouse hover on a specific area of the page, visiting different area of the computerized application, etc.).

There is thus a need in the art for a new retention policy determination system and method.

GENERAL DESCRIPTION

In accordance with a first aspect of the presently disclosed subject matter, there is provided a system comprising a processing circuitry configured to: obtain a plurality of recordings of respective sessions conducted on respective computerized applications; determine, for each recording of the recordings, one or more attributes, wherein at least one attribute of the attributes is determined by analyzing content of the respective recording; and determine, for each given recording of the recordings, based on the at least one attribute determined for the given recording, a respective retention policy, defining at least a retention period for retaining the given recording prior to deleting the given recording; wherein a first retention policy determined for a first recording of the recordings having a first set of one or more first attributes of the attributes is different than a second retention policy determined for a second recording of the recordings having a second set of one or more second attributes of the attributes, other than the first attributes.

In one embodiment of the presently disclosed subject matter, and/or embodiments thereof, the at least one attribute is determined upon the analysis of the content resulting in identification at least one of: (a) specific information displayed to a user of the respective computerized application during the respective session, or (b) an event taking place during the respective session.

In one embodiment of the presently disclosed subject matter, and/or embodiments thereof, the event is one of: (a) a click on one or more virtual objects displayed by the computerized application during the respective session, (b) entry to one or more pre-defined parts of the computerized application during the respective session, (c) occurrence of a pre-defined transaction during the respective session, (d) performance of a certain action during the respective session, (e) performance of an action sequence during the respective session, (f) a user attempting to manipulate content within the respective session, (g) a click on an element that is not configured to respond to clicks during the respective session, (h) performance of one or more gestures on a touchscreen of a device on which the computerized application is executing, during the respective session, or (i) provisioning of a command that triggers a specific action of the computerized application during the recorded session.

In one embodiment of the presently disclosed subject matter, and/or embodiments thereof, the click is made on a broken link.

In one embodiment of the presently disclosed subject matter, and/or embodiments thereof, the pre-defined transaction is of a minimal monetary value.

In one embodiment of the presently disclosed subject matter, and/or embodiments thereof, at least one attribute of the attributes is related to a struggle score calculated for the respective session based on the content.

In one embodiment of the presently disclosed subject matter, and/or embodiments thereof, the struggle score is indicative of a difficulty experienced by the user during the respective session and wherein the processing circuitry is further configured to calculate the struggle score for the respective session by analyzing the content of the respective session.

In one embodiment of the presently disclosed subject matter, and/or embodiments thereof, the computerized application is a web browser, a web application, or a mobile application.

In one embodiment of the presently disclosed subject matter, and/or embodiments thereof, the retention policy further defines a retention location defining a location for retaining the given recording.

In one embodiment of the presently disclosed subject matter, and/or embodiments thereof, the retention policy further defines a backup policy for the given recording.

In one embodiment of the presently disclosed subject matter, and/or embodiments thereof, the retention period of the first retention policy is shorter than the retention period of the second retention policy.

In one embodiment of the presently disclosed subject matter, and/or embodiments thereof, the processing circuitry is further configured to retain each given recording of the recordings in accordance with the respective retention policy.

In accordance with a second aspect of the presently disclosed subject matter, there is provided a system comprising a processing circuitry configured to: obtain a machine learning model configured to receive a recording of a session conducted on a respective computerized application and determine a retention policy for the recording, the retention policy defining at least a retention period for retaining the given recording prior to deleting the given recording; receive a given recording of a given session conducted on a given computerized application; and determine a given retention policy for the given recording utilizing the machine learning model.

In one embodiment of the presently disclosed subject matter, and/or embodiments thereof, the machine learning model is trained utilizing a training data set including a plurality of features extracted from reference recordings, each associated with a respective pre-determined retention period.

In one embodiment of the presently disclosed subject matter, and/or embodiments thereof, the processing circuitry is further configured to: receive a second recording of a second session conducted on a second computerized application; and determine a second retention policy for the second recording utilizing the machine learning model; wherein the retention period defined by the retention policy is different than the retention period defined by the second retention policy.

In one embodiment of the presently disclosed subject matter, and/or embodiments thereof, the retention policy further defines a retention location defining a location for retaining the given recording.

In one embodiment of the presently disclosed subject matter, and/or embodiments thereof, the retention policy further defines a backup policy for the given recording.

In one embodiment of the presently disclosed subject matter, and/or embodiments thereof, the computerized application is a web browser, a web application, or a mobile application.

In one embodiment of the presently disclosed subject matter, and/or embodiments thereof, the processing circuitry is further configured to retain each given recording of the recordings in accordance with the respective retention policy.

In accordance with a third aspect of the presently disclosed subject matter, there is provided a method comprising: obtaining, by a processing circuitry, a plurality of recordings of respective sessions conducted on respective computerized applications; determining, by the processing circuitry, for each recording of the recordings, one or more attributes, wherein at least one attribute of the attributes is determined by analyzing content of the respective recording; and determining, by the processing circuitry, for each given recording of the recordings, based on the at least one attribute determined for the given recording, a respective retention policy, defining at least a retention period for retaining the given recording prior to deleting the given recording; wherein a first retention policy determined for a first recording of the recordings having a first set of one or more first attributes of the attributes is different than a second retention policy determined for a second recording of the recordings having a second set of one or more second attributes of the attributes, other than the first attributes.

In one embodiment of the presently disclosed subject matter, and/or embodiments thereof, the at least one attribute is determined upon the analysis of the content resulting in identification at least one of: (a) specific information displayed to a user of the respective computerized application during the respective session, or (b) an event taking place during the respective session.

In one embodiment of the presently disclosed subject matter, and/or embodiments thereof, the event is one of: (a) a click on one or more virtual objects displayed by the computerized application during the respective session, (b) entry to one or more pre-defined parts of the computerized application during the respective session, (c) occurrence of a pre-defined transaction during the respective session, (d) performance of a certain action during the respective session, (e) performance of an action sequence during the respective session, (f) a user attempting to manipulate content within the respective session, (g) a click on an element that is not configured to respond to clicks during the respective session, (h) performance of one or more gestures on a touchscreen of a device on which the computerized application is executing, during the respective session, or (i) provisioning of a command that triggers a specific action of the computerized application during the recorded session.

In one embodiment of the presently disclosed subject matter, and/or embodiments thereof, the click is made on a broken link.

In one embodiment of the presently disclosed subject matter, and/or embodiments thereof, the pre-defined transaction is of a minimal monetary value.

In one embodiment of the presently disclosed subject matter, and/or embodiments thereof, at least one attribute of the attributes is related to a struggle score calculated for the respective session based on the content.

In one embodiment of the presently disclosed subject matter, and/or embodiments thereof, the struggle score is indicative of a difficulty experienced by the user during the respective session and wherein the method further comprises calculating, by the processing circuitry, the struggle score for the respective session by analyzing the content of the respective session.

In one embodiment of the presently disclosed subject matter, and/or embodiments thereof, the computerized application is a web browser, a web application, or a mobile application.

In one embodiment of the presently disclosed subject matter, and/or embodiments thereof, the retention policy further defines a retention location defining a location for retaining the given recording.

In one embodiment of the presently disclosed subject matter, and/or embodiments thereof, the retention policy further defines a backup policy for the given recording.

In one embodiment of the presently disclosed subject matter, and/or embodiments thereof, the retention period of the first retention policy is shorter than the retention period of the second retention policy.

In one embodiment of the presently disclosed subject matter, and/or embodiments thereof, the method further comprises retaining each given recording of the recordings in accordance with the respective retention policy.

In accordance with a fourth aspect of the presently disclosed subject matter, there is provided a method comprising: obtaining, by a processing circuitry, a machine learning model configured to receive a recording of a session conducted on a respective computerized application and determine a retention policy for the recording, the retention policy defining at least a retention period for retaining the given recording prior to deleting the given recording; receiving, by the processing circuitry, a given recording of a given session conducted on a given computerized application; and determining, by the processing circuitry, a given retention policy for the given recording utilizing the machine learning model.

In one embodiment of the presently disclosed subject matter, and/or embodiments thereof, the machine learning model is trained utilizing a training data set including a plurality of features extracted from reference recordings, each associated with a respective pre-determined retention period.

In one embodiment of the presently disclosed subject matter, and/or embodiments thereof, the method further comprises: receiving, by the processing circuitry, a second recording of a second session conducted on a second computerized application; and determining, by the processing circuitry, a second retention policy for the second recording utilizing the machine learning model; wherein the retention period defined by the retention policy is different than the retention period defined by the second retention policy.

In one embodiment of the presently disclosed subject matter, and/or embodiments thereof, the retention policy further defines a retention location defining a location for retaining the given recording.

In one embodiment of the presently disclosed subject matter, and/or embodiments thereof, the retention policy further defines a backup policy for the given In one embodiment of the presently disclosed subject matter, and/or embodiments thereof, the computerized application is a web browser, a web application, or a mobile application.

In one embodiment of the presently disclosed subject matter, and/or embodiments thereof, the method further comprises retaining each given recording of the recordings in accordance with the respective retention policy.

In accordance with a fifth aspect of the presently disclosed subject matter, there is provided a non-transitory computer readable storage medium having computer readable program code embodied therewith, the computer readable program code, executable by at least one processing resource of a computer to perform a method comprising: obtaining, by a processing circuitry, a plurality of recordings of respective sessions conducted on respective computerized applications; determining, by the processing circuitry, for each recording of the recordings, one or more attributes, wherein at least one attribute of the attributes is determined by analyzing content of the respective recording; and determining, by the processing circuitry, for each given recording of the recordings, based on the at least one attribute determined for the given recording, a respective retention policy, defining at least a retention period for retaining the given recording prior to deleting the given recording; wherein a first retention policy determined for a first recording of the recordings having a first set of one or more first attributes of the attributes is different than a second retention policy determined for a second recording of the recordings having a second set of one or more second attributes of the attributes, other than the first attributes.

In accordance with a sixth aspect of the presently disclosed subject matter, there is provided a non-transitory computer readable storage medium having computer readable program code embodied therewith, the computer readable program code, executable by at least one processing resource of a computer to perform a method comprising: obtaining, by a processing circuitry, a machine learning model configured to receive a recording of a session conducted on a respective computerized application and determine a retention policy for the recording, the retention policy defining at least a retention period for retaining the given recording prior to deleting the given recording; receiving, by the processing circuitry, a given recording of a given session conducted on a given computerized application; and determining, by the processing circuitry, a given retention policy for the given recording utilizing the machine learning model.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

Figure 1:
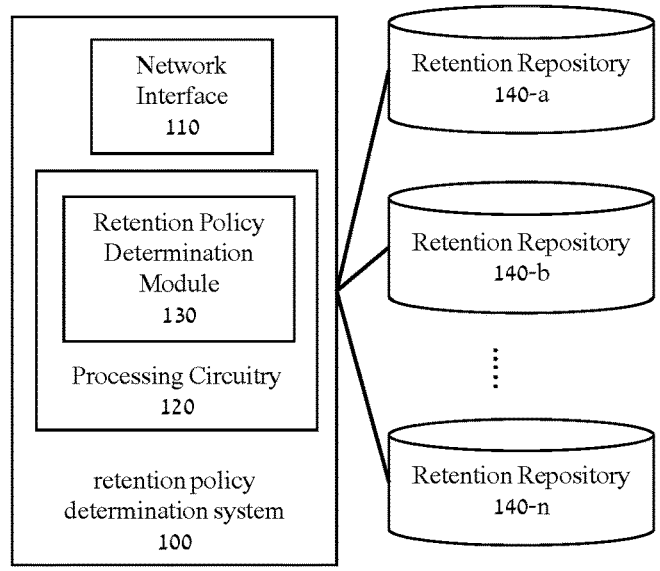
FIG. 1 is a block diagram schematically illustrating one example of an environment and a retention policy determination system, in accordance with the presently disclosed subject matter.

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "obtaining", "determining", "receiving", "training", "performing", "calculating" or the like, include action and/or processes of a computer that manipulate and/or transform data into other data, said data represented as physical quantities, e.g. such as electronic quantities, and/or said data representing the physical objects. The terms "computer", "processor", "processing resource", "processing circuitry" and "controller" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. digital signal processor (DSP), a microcontroller, a field programmable gate array (FPGA), an application specific integrated circuit (ASIC), etc.), a group of multiple physical machines sharing performance of various tasks, virtual servers co-residing on a single physical machine, any other electronic computing device, and/or any combination thereof.

The operations in accordance with the teachings herein may be performed by a computer specially constructed for the desired purposes or by a general-purpose computer specially configured for the desired purpose by a computer program stored in a non-transitory computer readable storage medium. The term "non-transitory" is used herein to exclude transitory, propagating signals, but to otherwise include any volatile or non-volatile computer memory technology suitable to the application.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus, the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 2:
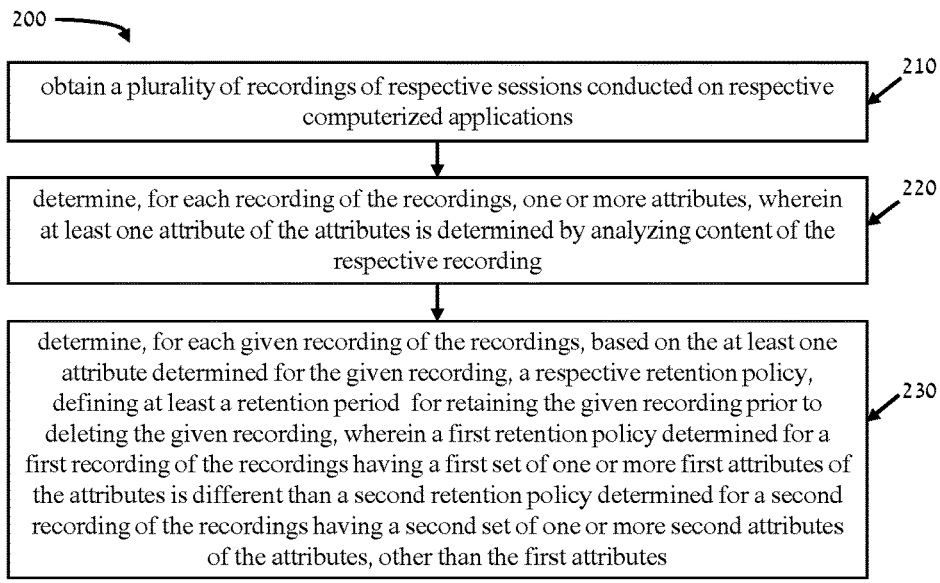
FIG. 2 is a flowchart illustrating one example of a sequence of operations carried out for determining a retention policy, in accordance with the presently disclosed subject matter.
Figure 3:
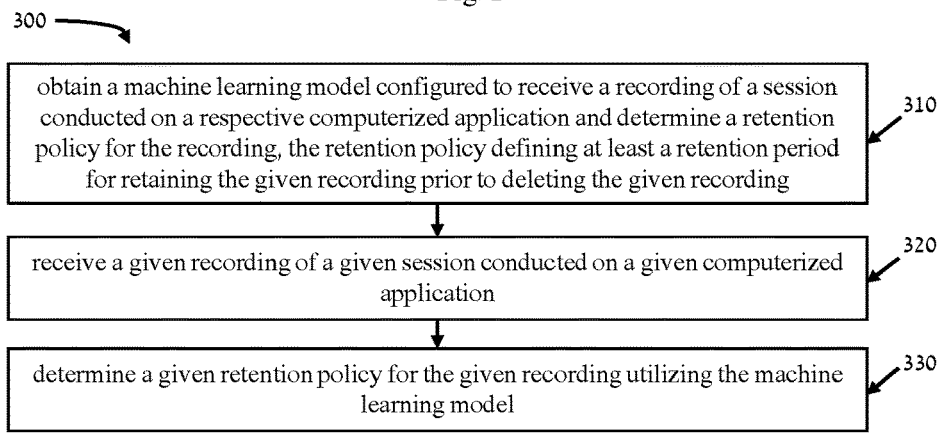
FIG. 3 is a flowchart illustrating another example of a sequence of operations carried out for determining a retention policy, in accordance with the presently disclosed subject matter.

In embodiments of the presently disclosed subject matter, fewer, more and/or different stages than those shown in FIGS. 2-3 may be executed. In embodiments of the presently disclosed subject matter one or more stages illustrated in FIGS. 2-3 may be executed in a different order and/or one or more groups of stages may be executed simultaneously. FIG. 1 illustrate a general schematic of the system architecture in accordance with an embodiment of the presently disclosed subject matter. Each module in FIG. 1 can be made up of any combination of software, hardware and/or firmware that performs the functions as defined and explained herein. The modules in FIG. 1 may be centralized in one location or dispersed over more than one location. In other embodiments of the presently disclosed subject matter, the system may comprise fewer, more, and/or different modules than those shown in FIG. 1.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Bearing this in mind, attention is drawn to FIG. 1, a block diagram schematically illustrating one example of a retention policy determination system, in accordance with the presently disclosed subject matter.

According to certain examples of the presently disclosed subject matter, a plurality of user devices can be used by respective users in order to engage in session/s conducted between user devices (via computerized applications installed thereon, such as web browsers, web applications, mobile applications, and the like) and other respective device/s (such as server/s). The user devices can be personal computers, laptop computers, smartphones, smart televisions, smart speakers, tablet computers, or any other device capable of executing a computerized application through which the user device can engage in a session with another device (e.g. a server) via a computerized network.

The sessions between the user devices and the other devices (e.g. servers) can be web sessions (in which users use a web browser installed on their user device to interact with websites stored on web-servers), mobile sessions (in which users use applications installed on their user device to interact with application servers), or any other session in which the user device communicates with other devices (e.g. servers), e.g. by the user device sending requests to the other device, and by the other device sending responses to the user device.

In some cases, the sessions, or parts thereof (e.g. certain parts of time of the sessions, or certain parts of data transferred between the user device and the other device taking part in the session during the session), and optionally additional data associated with the sessions (e.g. certain parts of the data generated by the user device e.g. as a result of the data transferred to it by the other device or in any other way (e.g. a Document Object Model (DOM) of a webpage, a Mobile App view, etc.)), can be recorded for various purposes. Such recording of sessions is known as session recording.

Once a session is recorded, it can be used for various purposes, including analyzing the sessions (whether automatically or by a human replaying the sessions in order to view at least parts of it), using it for forensic purposes (including fraud prevention), etc., for as long as the recorded sessions are retained.

Currently, none of the session recording systems known in the art enables determining a retention policy for a recorded session based on one or more attributes determined by analyzing internal content of the recorded session (also referred to herein as: "recording"), as discussed herein. It is to be noted that when reference is made herein to analysis of internal content, such analysis can be made in order to understanding what happened during the session in order to determine the retention policy.

In accordance with the presently disclosed subject matter, there is provided a retention policy determination system 100. Retention policy determination system 100 can comprise a network interface 110 enabling connecting retention policy determination system 100 to a network and enabling it to send and receive data sent thereto through the network, including in some cases receiving sessions for retention, or information associated with sessions for retention, and sending sessions for retention to retention server/s. In some cases, the network interface 110 can be connected to a Local Area Network (LAN), to a Wide Area Network (WAN), or to the Internet. In some cases, the network interface 110 can connect to a wireless network.

It is to be noted that in some cases the retention policy determination system 100 can be distributed. For example, the retention policy determination system 100 can be implemented by an agent that can be installed on each of the user devices on which the sessions for retention are conducted, or by JavaScript code executing thereon, and each such user device can implement the teachings herein, or parts thereof, internally. In some cases, part of the operations disclosed herein with reference to the retention policy determination system 100 can be implemented on the user devices, while other parts can be implemented on one or more centralized servers, as further detailed herein.

Retention policy determination system 100 further comprises processing circuitry 120. Processing circuitry 120 can be one or more processing circuitry units (e.g. central processing units), microprocessors, microcontrollers (e.g. microcontroller units (MCUs)) or any other computing devices or modules, including multiple and/or parallel and/or distributed processing circuitry units, which are adapted to independently or cooperatively process data for controlling relevant retention policy determination system 100 resources and for enabling operations related to retention policy determination system 100 resources.

The processing circuitry 120 comprises a retention policy determination module 130, configured to perform one or more retention policy determination processes, as further detailed herein, inter alia with reference to FIGS. 2 and 3.

Retention policy determination system 100 can further comprise or be otherwise associated with one or more retention repositories (e.g. retention repository 140-a, retention repository 140-b, . . . , retention repository 140-n). Each of the retention repositories can be a database, a storage system (including a cloud-based storage system), a memory including Read Only Memory—ROM, Random Access Memory—RAM, or any other type of memory enabling data retention configured to store recorded sessions. In some cases, the retention repositories can be further configured to enable retrieval and/or update and/or deletion of the data stored thereon. It is to be noted that in some cases, all, or some, of the retention repositories can be distributed. It is to be noted that in some cases, all, or some, of the retention repositories can be stored in on cloud-based storage, and all, or some, of the retention repositories can be comprised within the retention policy determination system 100.

It is to be noted that in some cases, retention policy determination system 100 is a distributed system. In some cases, retention policy determination system 100 can be hosted on a cloud computing platform.

Turning to FIG. 2, there is shown a flowchart illustrating one example of a sequence of operations carried out for determining a retention policy, in accordance with the presently disclosed subject matter.

According to certain examples of the presently disclosed subject matter, retention policy determination system 100 can be configured to perform a retention policy determination process 200, e.g. utilizing the retention policy determination module 130.

For this purpose, retention policy determination system 100 is configured to obtain a plurality of recordings of respective sessions conducted on respective computerized applications (block 210). As indicated herein, a session is conducted between a computerized application installed on a user device, and another device, such as a server with which the computerized application communicates (via a network such as the Internet). The recordings are recordings of all, or parts, of such sessions, that can later be analyzed in order to extract insights as required (while noting that in some cases insights can be additionally, or alternatively, extracted by the user device while the session is taking place thereon).

Retention policy determination system 100 determines, for at least part of the recordings received in block 210 (and in some cases for each recording received in block 210), one or more attributes (block 220). At least one of the attributes is determined by analyzing the internal content of the respective recording. In some cases, the at least one attribute is determined upon analysis of the internal content resulting in identification of at least one of: (a) specific information displayed to a user of the respective computerized application during the respective session, (b) an event taking place during the respective session or (c) specific information that was sent between the user device and the other device.

It is to be noted that in some cases, one or more of the attributes, and in more specific cases, all of the attributes, can be determined by the user devices. In such cases, the user devices can send the attributes to the retention policy determination system 100 for further processing.

It is to be further noted that various information can be displayed to the user during a session (that is recorded). In some cases, one or more pieces of information that are displayed can be associated with respective attributes so that when a given piece of information is displayed to the user during a recorded session, the recorded session can be associated with the attribute that is associated with such given piece of information. For example, if during the recorded session the user is provided with an alert indicating that the user has performed an illegal action during the session, the recorded session can be associated with an "illegal action" attribute. Similarly, if during the session (that is recorded) the user is provided with information of a balance the user has in his bank account and the balance is negative, the recorded session can be associated with an "overdraft" attribute.

With reference to the events, it is to be noted that an event that is identified within a session that is recorded can be any one of examples:

(a) a click (while noting that whenever reference is made throughout this description to "click" it can be any provisioning of user input that triggers a specific action of the computerized application; it can be a click or a tap on a clickable object displayed to the user such as a virtual button, a hyperlink, a DOM object, or any section of the screen, etc.) on one or more virtual objects displayed by the computerized application during the recorded session (e.g. a click on a button that results in performance of a transaction, a click on a button that results in opening of a chat to receive help from a representative, a click on a link that did not result in opening of the link, (also known as a broken link), or the like);

(b) performance of one or more gestures on a touchscreen of a device on which the computerized application is executing, during the recorded session;

(c) entry to one or more pre-defined parts of the computerized application during the recorded session (e.g. entering an order page, entering an FAQ (Frequently Asked Questions) page, entering a complaint page, or the like);

(d) occurrence of a pre-defined transaction during the recorded session (e.g. purchasing of a certain item or service, purchasing of a certain item or service with a minimal monetary value, or the like);

(e) performance of a certain action during the recorded session (e.g. performing a rage click in which the user is repeatedly clicking the mouse button/s, keyboard buttons, a touchscreen, etc., scrolling at a certain speed, hovering the mouse pointer over one or more elements displayed to the user (also known as mouse hover), or the like);

(f) performance of an action sequence during the recorded session (e.g. filling a sequence of text boxes and then clicking a button, navigating between screens/pages of the computerized application back and forth one or more times, etc.);

(g) a user attempting to manipulate content within the recorded session (e.g. a user clicking the F12 button within a web browser (being the computerized application installed on the user device in which the session is conducted), thereby opening an editor that enables manipulation of the content displayed to the user, which can be part of a fraud attempt, etc.);

(h) a click on an element that is not configured to respond to clicks during the recorded session (e.g. when the user is clicking parts of the computerized application that are not supposed to be clicked on, and optionally clicking such parts multiple times);

(i) occurrence of an event (e.g. a crash of the computerized application, an error in the computerized application or in the loading thereof, an amount of memory and/or Central Processing Unit (CPU) used by the computerized application exceeding a threshold, etc.), or occurrence of an event that meets certain rules (e.g. a load time of the computerized application, or parts thereof (e.g. a specific webpage) took more time than a threshold (noting that the threshold can be predefined, or it can be dynamically calculated, optionally using machine learning), content loaded by the computerized application exceeded a predefined size, etc.;

(j) provisioning of any type of command that triggers a specific action of the computerized application during the recorded session (e.g. a voice command, a command provided using the user's eyes or mind, etc.).

It is to be noted that these are mere examples and other types of actions are contemplated as well, as any person of ordinary skill in the art can appreciate.

One specific type of attribute with which a recorded session can be associated (in addition to, or as an alternative for, the attributes discussed above) can be related to a struggle score calculated for the respective session based on the content, the actions made by the user during the session, or occurrence of one or more events during the session (or any combination thereof). A struggle score is indicative of a difficulty experienced by the user during the respective session. In this respect, it can be noted that a struggle is a condition of the customer experience, where customers encounter difficulties when they interact with a website or an application, thus not completing the end goals of the website or application. For example, Struggle in an e-commerce website can happen when customers try to complete a purchase but are unable to do so. Struggle on a website or an application can manifest in different ways. Indications of struggle can include repetitive clicking on a UI element, multiple attempts to complete a form field or going back and forth between pages on a website multiple time. One specific example of determination of a struggle score can be found in Applicant's U.S. patent application Ser. No. 17/105,548 filed on Nov. 26, 2020, which is incorporated herein in its entirety.

It can be appreciated that in some cases the processing circuitry can be configured to calculate the struggle score for a recorded session by analyzing the content thereof.

It is to be noted that in some cases, a single recorded session can be associated with a plurality of attributes, and more specifically, with a plurality of attributes that are determined by analyzing the content of the session recording.

Based on the at least one attribute determined for the recording at block 220, retention policy determination system 100 can be configured to determine a respective retention policy, defining at least a retention period for retaining the given recording prior to deleting the given recording from its storage location (block 230).

It is to be noted that in some cases the retention policy can be determined by the user devices. In such cases, the user devices can send the attributes to the retention policy determination system 100 for further processing.

In some cases, the retention period can vary between different recordings, so that a first retention policy determined for a first recording having a certain attribute/s is different than a second retention policy determined for a second recording having other attributes different than the attributed of the first recording (for example, the first recording can be retained for seven years whereas the second recording can be retained for one year). As an example, the retention period of the first retention policy can be shorter than the retention period of the second retention policy, or vice versa.

In other cases, the retention policy determined at block 230 can simply define whether to retain the given recording or not to retain it. Those recordings that are retained can be retained for a default period of time.

It is to be noted that in some cases the retention period can be indefinite. In some cases, although not shown in the figure, the retention policy determination system 100 can be configured to retain each given recording of the recordings in accordance with the respective retention policy determined thereto in block 230. In those cases where the retention policy defines a retention location (e.g. any of retention repository 140-a, retention repository 140-b, . . . , retention repository 140-n), retention policy determination system 100 can retain the given recording in this location (e.g. it can send it to the retention location via the network interface 110). It is to be noted that the retention location can be determined based on the attributes determined for the given recording.

In order to implement the retention policy, retention policy determination system 100 can optionally be configured to delete the retained sessions when their respective retention period is over. This can be implemented, for example, by a scheduler that can be defined to execute on certain time intervals (e.g. every day) and delete those sessions that are to be deleted in accordance with their retention policy. It is to be noted that the retention policy can be enforced in any other manner by which the recorded sessions are deleted in accordance with their respective retention policies.

In some cases, the retention policy further defines a backup policy for the given recording, indicating for example a backup frequency, a backup location, etc. for the retained session, etc. It is to be noted that the backup policy can be different for two different recordings based on the attributes determined thereto.

It is to be noted that, with reference to FIG. 2, some of the blocks can be integrated into a consolidated block or can be broken down to a few blocks and/or other blocks may be added. Furthermore, in some cases, the blocks can be performed in a different order than described herein. It is to be further noted that some of the blocks are optional. It should be also noted that whilst the flow diagram is described also with reference to the system elements that realizes them, this is by no means binding, and the blocks can be performed by elements other than those described herein.

Attention is now drawn to FIG. 3, there is shown a flowchart illustrating another example of a sequence of operations carried out for determining a retention policy, in accordance with the presently disclosed subject matter.

According to certain examples of the presently disclosed subject matter, retention policy determination system 100 can be configured to perform a retention policy determination process 300 (other than retention policy determination process 200), e.g. utilizing the retention policy determination module 130.

For this purpose, retention policy determination system 100 is configured to obtain (e.g. receive from another source or generate internally for example) a machine learning model configured to receive a recording of a session conducted on a respective computerized application and determine a retention policy for the recording (block 310). The retention policy defines at least a retention period for retaining the given recording prior to deleting the given recording. The machine learning model can be trained utilizing a training data set including a plurality of features extracted from reference recordings of sessions, each associated with a respective pre-determined retention period.

Retention policy determination system 100 can then receive a given recording of a given session conducted on a given computerized application (block 320), and determine a given retention policy for the given recording utilizing the machine learning model obtained at block 310 (block 330).

In some cases, the retention policy that is determined for different recordings is not identical. Accordingly, retention policy determination system 100 can receive a second recording of a second session conducted on a second computerized application, determine a second retention policy for the second recording utilizing the machine learning model, wherein the retention period defined by the retention policy is different than the retention period defined by the second retention policy.

It is to be reiterated here that in some cases the retention policy determination system 100 can be distributed. For example, the retention policy determination system 100 can be implemented by an agent that can be installed on each of the user devices on which the sessions for retention are conducted, or by JavaScript code executing thereon, and each such user device can implement the teachings herein, or parts thereof, internally. In some cases, part of the operations disclosed herein with reference to the retention policy determination system 100 can be implemented on the user devices, while other parts can be implemented on one or more centralized servers.

As indicated herein, with reference to FIG. 2, in some cases, although not shown in the figure, the retention policy determination system 100 can be configured to retain each given recording of the recordings in accordance with the respective retention policy determined thereto in block 330. In those cases where the retention policy defines a retention location (e.g. any of retention repository 140-a, retention repository 140-b, . . . , retention repository 140-n), retention policy determination system 100 can retain the given recording in this location (e.g. it can send it to the retention location via the network interface 110). It is to be noted that the retention location can be determined based on the attributes determined for the given recording.

In some cases, the retention policy further defines a backup policy for the given recording, indicating for example a backup frequency, a backup location, etc. for the retained session, etc. It is to be noted that the backup policy can be different for two different recordings based on the attributes determined thereto.

It is to be noted that, with reference to FIG. 3, some of the blocks can be integrated into a consolidated block or can be broken down to a few blocks and/or other blocks may be added. Furthermore, in some cases, the blocks can be performed in a different order than described herein. It is to be further noted that some of the blocks are optional. It should be also noted that whilst the flow diagram is described also with reference to the system elements that realizes them, this is by no means binding, and the blocks can be performed by elements other than those described herein.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

The invention claimed is:

1. A system comprising a processing circuitry configured to:
   obtain a plurality of recordings of respective sessions conducted on respective computerized applications;
   determine, for each recording of the recordings, one or more attributes, wherein at least one attribute of the attributes is determined by analyzing content of the respective recording, and wherein the at least one attribute:
   (A) is related to a struggle score calculated for the respective session based on the content; or
   (B) is determined upon the analysis of the content resulting in identification of an event taking place during the respective session, wherein the event is one of: (a) a click on one or more virtual objects displayed by the computerized application during the respective session, (b) entry to one or more pre-defined parts of the computerized application during the respective session, (c) occurrence of a pre-defined transaction during the respective session, (d) a click on an element that is not configured to respond to clicks during the respective session, or (e) performance of one or more gestures on a touchscreen of a device on which the computerized application is executing, during the respective session; and
   determine, for each given recording of the recordings, based on the at least one attribute determined for the given recording by analyzing the content of the given recording, a respective retention policy, defining at least a retention period for retaining the given recording prior to deleting the given recording;
   wherein a first retention policy determined for a first recording of the recordings having a first set of one or more first attributes of the attributes is different than a second retention policy determined for a second recording of the recordings having a second set of one or more second attributes of the attributes, other than the first attributes.

2. The system of claim 1, wherein the at least one attribute is determined upon the analysis of the content resulting in identification of specific information displayed to a user of the respective computerized application during the respective session.

3. The system of claim 1, wherein the struggle score is indicative of a difficulty experienced by the user during the respective session and wherein the processing circuitry is further configured to calculate the struggle score for the respective session by analyzing the content of the respective session.

4. The system of claim 1, wherein the computerized application is a web browser, a web application, or a mobile application.

5. The system of claim 1, wherein the retention policy further defines a retention location defining a location for retaining the given recording.

6. The system of claim 1, wherein the retention policy further defines a backup policy for the given recording.

7. The system of claim 1, wherein the retention period of the first retention policy is shorter than the retention period of the second retention policy.

8. The system of claim 1, wherein the processing circuitry is further configured to retain each given recording of the recordings in accordance with the respective retention policy.

9. A method comprising:
obtaining, by a processing circuitry, a plurality of recordings of respective sessions conducted on respective computerized applications;
determining, by the processing circuitry, for each recording of the recordings, one or more attributes, wherein at least one attribute of the attributes is determined by analyzing content of the respective recording, and wherein the at least one attribute:
(A) is related to a struggle score calculated for the respective session based on the content; or
(B) is determined upon the analysis of the content resulting in identification of an event taking place during the respective session, wherein the event is one of: (a) a click on one or more virtual objects displayed by the computerized application during the respective session, (b) entry to one or more pre-defined parts of the computerized application during the respective session, (c) occurrence of a pre-defined transaction during the respective session, (d) a click on an element that is not configured to respond to clicks during the respective session, or (e) performance of one or more gestures on a touchscreen of a device on which the computerized application is executing, during the respective session; and
determining, by the processing circuitry, for each given recording of the recordings, based on the at least one attribute determined for the given recording by analyzing the content of the given recording, a respective retention policy, defining at least a retention period for retaining the given recording prior to deleting the given recording;
wherein a first retention policy determined for a first recording of the recordings having a first set of one or more first attributes of the attributes is different than a second retention policy determined for a second recording of the recordings having a second set of one or more second attributes of the attributes, other than the first attributes.

10. The method of claim 9, wherein the at least one attribute is determined upon the analysis of the content resulting in identification specific information displayed to a user of the respective computerized application during the respective session.

11. The method of claim 9, wherein the computerized application is a web browser, a web application, or a mobile application.

12. The method of claim 9, wherein the retention policy further defines a retention location defining a location for retaining the given recording.

13. The method of claim 9, wherein the retention policy further defines a backup policy for the given recording.

14. The method of claim 9, wherein the retention period of the first retention policy is shorter than the retention period of the second retention policy.

15. The method of claim 9, further comprising retaining each given recording of the recordings in accordance with the respective retention policy.

16. A non-transitory computer readable storage medium having computer readable program code embodied therewith, the computer readable program code, executable by at least one processing resource of a computer to perform a method comprising:
obtaining, by a processing circuitry, a plurality of recordings of respective sessions conducted on respective computerized applications;
determining, by the processing circuitry, for each recording of the recordings, one or more attributes, wherein at least one attribute of the attributes is determined by analyzing content of the respective recording, and wherein the at least one attribute:
(A) is related to a struggle score calculated for the respective session based on the content; or
(B) is determined upon the analysis of the content resulting in identification of an event taking place during the respective session, wherein the event is one of: (a) a click on one or more virtual objects displayed by the computerized application during the respective session, (b) entry to one or more pre-defined parts of the computerized application during the respective session, (c) occurrence of a pre-defined transaction during the respective session, (d) a click on an element that is not configured to respond to clicks during the respective session, or (e) performance of one or more gestures on a touchscreen of a device on which the computerized application is executing, during the respective session; and
determining, by the processing circuitry, for each given recording of the recordings, based on the at least one attribute determined for the given recording by analyzing the content of the given recording, a respective retention policy, defining at least a retention period for retaining the given recording prior to deleting the given recording;
wherein a first retention policy determined for a first recording of the recordings having a first set of one or more first attributes of the attributes is different than a second retention policy determined for a second recording of the recordings having a second set of one or more second attributes of the attributes, other than the first attributes.

* * * * *